US009015224B2

(12) United States Patent
Nachtrab et al.

(10) Patent No.: US 9,015,224 B2
(45) Date of Patent: Apr. 21, 2015

(54) INTERACTIVE RESPONSE OF A REMOTE MONITORING AND MANAGEMENT SYSTEM

(71) Applicant: LabTech, LLC, Tampa, FL (US)

(72) Inventors: Matthew Nachtrab, Tampa, FL (US); Gregory Francis Buerk, Whitehouse, OH (US)

(73) Assignee: LabTech, LLC, Tampa, FL (US)

( * ) Notice: Subject to any disclaimer, the term of this patent is extended or adjusted under 35 U.S.C. 154(b) by 360 days.

(21) Appl. No.: 13/647,975

(22) Filed: Oct. 9, 2012

(65) Prior Publication Data
US 2013/0091193 A1    Apr. 11, 2013

Related U.S. Application Data

(60) Provisional application No. 61/545,177, filed on Oct. 9, 2011.

(51) Int. Cl.
H04L 29/06    (2006.01)
H04L 29/08    (2006.01)

(52) U.S. Cl.
CPC .......... H04L 63/20 (2013.01); H04L 29/08567 (2013.01); H04L 67/125 (2013.01); H04L 69/28 (2013.01)

(58) Field of Classification Search
None
See application file for complete search history.

(56) References Cited

U.S. PATENT DOCUMENTS

| 4,642,758 | A | 2/1987 | Teng |
| 5,831,662 | A | 11/1998 | Payton |
| 6,009,473 | A | 12/1999 | Lowe |
| 6,115,745 | A * | 9/2000 | Berstis et al. ................. 709/227 |
| 6,424,993 | B1 | 7/2002 | Weber |
| 6,751,729 | B1 | 6/2004 | Giniger et al. |
| 6,968,379 | B2 | 11/2005 | Nielsen |
| 7,088,736 | B2 | 8/2006 | Altenbernd et al. |
| 7,161,907 | B2 | 1/2007 | Mott |
| 7,440,452 | B1 | 10/2008 | Giniger et al. |
| 7,558,862 | B1 | 7/2009 | Tyukasz et al. |
| 7,580,972 | B2 | 8/2009 | Jones et al. |
| 7,620,707 | B1 | 11/2009 | Sutherland et al. |
| 7,734,799 | B1 | 6/2010 | Anka |
| 7,765,316 | B1 | 7/2010 | Huckins |

(Continued)

OTHER PUBLICATIONS

LabTech, LabTech Software Announces Release of LabTech 2010.2, Nov. 18, 2010, Tampa, Florida.

(Continued)

*Primary Examiner* — Nicholas Taylor
*Assistant Examiner* — Clayton R Williams
(74) *Attorney, Agent, or Firm* — John D. Lanza; Foley & Lardner LLP

(57) ABSTRACT

A system for providing management functions on remote devices includes a management module, a connection module, an execution module, a timer module, a notification module, and a response module. The management module configures management commands on a central management server. The connection module initiates a connection to the server from an agent on a remote device and retrieves commands. The execution module executes the commands on the device. The timer module controls the initiation of the connection and can be delayed by a timer offset. The notification module uses a local network to send notifications to other agents. The response module responds to the notifications. Some of the commands can modify the timer offset, and other commands can initiate the notifications.

25 Claims, 13 Drawing Sheets

(56) References Cited

U.S. PATENT DOCUMENTS

| | | |
|---|---|---|
| 7,814,190 B2 | 10/2010 | Kacin et al. |
| 7,818,427 B2 | 10/2010 | Kacin et al. |
| 7,827,547 B1 | 11/2010 | Sutherland et al. |
| 7,890,615 B2 | 2/2011 | Kacin et al. |
| 7,912,976 B2 | 3/2011 | Guthrie et al. |
| 7,941,599 B2 | 5/2011 | Kacin et al. |
| 7,984,143 B2 | 7/2011 | Sullivan |
| 8,042,169 B2 | 10/2011 | Logigan et al. |
| 8,086,740 B2 | 12/2011 | Tyukasz et al. |
| 8,103,751 B2 | 1/2012 | Kacin et al. |
| 8,140,748 B2 | 3/2012 | Kacin et al. |
| 8,161,162 B1 | 4/2012 | Sutherland et al. |
| 8,195,797 B2 | 6/2012 | Sullivan |
| 8,200,794 B1 | 6/2012 | Sutherland et al. |
| 8,214,476 B2 | 7/2012 | Sullivan |
| 8,271,637 B2 | 9/2012 | Sutherland et al. |
| 8,571,931 B2* | 10/2013 | Riedl et al. ................. 705/14.49 |
| 2004/0024869 A1 | 2/2004 | Davies |
| 2005/0135410 A1 | 6/2005 | Stephens |
| 2007/0147332 A1 | 6/2007 | Lappetelainen et al. |
| 2007/0230421 A1* | 10/2007 | Roadknight ................. 370/338 |
| 2008/0091773 A1 | 4/2008 | Hameen-Anttila |
| 2008/0120210 A1 | 5/2008 | Leventhal |
| 2008/0307318 A1 | 12/2008 | Sullivan |
| 2008/0313231 A1 | 12/2008 | Kloba |
| 2009/0059950 A1 | 3/2009 | Gao et al. |
| 2009/0204666 A1* | 8/2009 | Sana et al. .................... 709/203 |
| 2009/0305778 A1* | 12/2009 | Yu et al. ......................... 463/29 |
| 2010/0064299 A1 | 3/2010 | Kacin et al. |
| 2010/0100778 A1 | 4/2010 | Sullivan |
| 2010/0106842 A1 | 4/2010 | Cosmadopoulos et al. |
| 2010/0127881 A1* | 5/2010 | Schechter et al. ............ 340/584 |
| 2010/0214942 A1 | 8/2010 | Du et al. |
| 2010/0223368 A1 | 9/2010 | Runcie et al. |
| 2010/0241736 A1 | 9/2010 | Anka |
| 2010/0250681 A1 | 9/2010 | Van Wely |
| 2011/0078676 A1 | 3/2011 | Sutherland et al. |
| 2011/0145056 A1 | 6/2011 | Sullivan et al. |
| 2012/0064875 A1 | 3/2012 | Miller |
| 2012/0064880 A1 | 3/2012 | Miller |
| 2012/0096172 A1 | 4/2012 | Tyukasz et al. |
| 2012/0110173 A1 | 5/2012 | Luna et al. |
| 2012/0124185 A1 | 5/2012 | Kacin et al. |
| 2012/0131095 A1 | 5/2012 | Luna et al. |
| 2012/0170569 A1 | 7/2012 | Al-Khudairi |
| 2012/0191802 A1 | 7/2012 | Rodrigues |
| 2012/0191828 A1 | 7/2012 | Rodrigues |
| 2012/0191829 A1 | 7/2012 | Rodrigues |
| 2012/0198044 A1 | 8/2012 | Sutherland et al. |
| 2012/0246479 A1 | 9/2012 | Sutherland et al. |
| 2013/0091193 A1 | 4/2013 | Nachtrab et al. |

OTHER PUBLICATIONS

LabTech, LabTech Software Releases Newest, Fastest Version of Its Worldwide Leading Remote Monitoring and Management Solution, Oct. 5, 2011, Tampa, Florida.

LabTech, Most Powerful RMM and Automation Solution for MSPs Gets Even Better, Jun. 14, 2010, Toledo, Ohio.

Office Action in U.S. Appl. No. 13/678,326 dated Dec. 22, 2014.

* cited by examiner

INTERACTIVE RESPONSE OF A REMOTE MONITORING AND MANAGEMENT SYSTEM

CROSS-REFERENCE TO RELATED PATENT APPLICATIONS

The present application claims priority to and the benefit of U.S. Provisional Patent Application No. 61/545,177, filed Oct. 9, 2011 entitled "Improving the Interactive Response of a Remote Monitoring and Management System," the contents of which is incorporated by reference in its entirety.

TECHNICAL FIELD

The present invention generally relates to the management of remote devices from a central server, and more specifically to improving the interactive response of such management. The improvement is achieved using the cooperation of techniques implemented at both the central server and in an agent on the remote devices being managed.

BACKGROUND OF THE INVENTION

Remote Monitoring and Management (RMM) systems are becoming increasingly popular for managing remote devices from a central server. They can be used to reduce the cost of system management, improve the quality of the environment, and improve the satisfaction of end users in receiving support. However, because of security issues, RMM systems typically have a delay inherent in their operation. This delay can interfere with the utility of the system in common circumstances. Reducing or eliminating the delay therefore makes the system much more powerful and valuable. RMM systems have historically used a variety of techniques to mitigate the delay.

One way to reduce the delay is to increase the polling rate of the remote devices in contacting the server. However, this does not scale very well. With even a modest number of remote devices, the server must be fairly powerful to handle the communication load, and a large amount of bandwidth is used for these frequent but largely unproductive connections. Both of these can greatly increase the cost of operation.

Other RMM systems have achieved improvements in interactive response by having the agent on each device maintain an open network connection to the central server. The agent then idles in a state where it is waiting for a response from the server, and the server can immediately initiate action by providing that response. However, this approach has many significant drawbacks, some of which are now listed.

Keeping open connections requires the use of ephemeral ports on the server. The most common implementation of this is Transmission Control Protocol (TCP), which provides about 64,000 such ports. In a large installation with an active server, this limit could easily be reached, preventing the ability to leave open connections active.

The implementation of TCP on the server must keep track of the long list of open connections being maintained by the agents. The TCP implementation is likely to slow down when the list gets long, increasing the overhead of network operations on the server.

Certain security vulnerabilities involve "hijacking" a TCP connection, which starts by "guessing" (or otherwise deriving) the state of the connection on the agent and the server. The longer a connection is open, the easier this "guessing" operation becomes, so connections that are open for extremely long periods of time are increasingly vulnerable to hijacking.

Some implementations of TCP may close an "idle" connection silently on the server side with no notification to the agent. If the definition of "idle" includes a connection that has been open for some period of time with no traffic, then this will happen on a regular basis with agents that leave a connection open for a long time. Since the agent will be disconnected but will still be waiting for a server response, the net result will be that the agent is unreachable for management.

In order to get around the previous limitation, some agent implementations use "keepalives" to maintain the connection. These keepalives are periodic transmissions that utilize the network but do not actually transmit any significant data. However, with many agents keeping connections open to the server, these keepalives can represent a significant fraction of the network bandwidth of the server, which wastes valuable resources on the server, both in network bandwidth and processing time in the network implementation.

Some RMM systems get around the previous limitation by using a proprietary protocol that has keepalive processing built in with reduced bandwidth requirements. These implementations often run afoul of the wide variety of firewall and network security tools in use, because those tools are not aware of the proprietary protocol and may act in such a way to block or disable it.

A minor interruption in network service on the server can close all the connections to agents. In a system that maintains these connections open for long periods of time, all of the agents will attempt to open new connections to the server after such an interruption. This will have an immediate and large impact on the server as it tries to service all of these requests.

SUMMARY OF THE INVENTION

The present invention describes a system that improves the interactive response of an RMM system without using either short polling periods or persistent connections. It avoids the problems introduced by those two methods while maintaining all the benefits. The resulting system maintains high overall security and integrity, but still provides fast response to management functions initiated on the RMM server. This provides the ability to use those management functions in interactive ways, which satisfies the need to be responsive to live end-user demands.

The present invention has many significant advantages. For example, the present invention allows for the use of standard protocols that have been in use since the early days of TCP, and therefore are already built into all network security tools. This may allows the present invention to work easily in existing installations without requiring extensive modifications. The present invention does not require firewall configurations that allow incoming connections from the server to the agents. The present invention adapts to changing configurations of the devices under management, continuing to work well when devices become unavailable. The present invention reduces the overall load on the RMM server, and reduces the bandwidth to the server as well. This allows the use of simpler computer and networking hardware for that server, making the RMM system more cost effective and commercially valuable.

The present invention describes a system for providing management functions on one or more remote devices, comprising a central management server, one or more management commands, a management module that configures one or more of said commands on said server, one or more remote devices, an agent on one or more of said devices, a connection module that initiates a connection from said agent to said server and retrieves one or more of said commands, an execution module that executes said commands on said device, a timer module that controls said initiation of said connection, a timer offset that controls the delay of said timer, one or more of said commands configured to modify said offset, a local network connected to one or more of said devices, a notification module that uses said network to send a notification to one or more of said agents, one or more of said commands configured to initiate said notification, and a response module that responds to said notification.

In some aspects, the present invention is directed to a system for managing remote devices. In some embodiments, the system includes a management module. The management module may execute on a central management server. The management module may configure one or more management commands to modify a timer offset and/or initiate a notification. In some embodiments, the system includes a connection module. The connection module may execute on an agent of a remote device. In some embodiments, an agent may execute on each of a plurality of remote devices. The connection module may be configured to initiate a connection from the agent to the central management server. The connection module may also receive the management commands configured by the management module. In some embodiments, the initiation of the connection is delayed by the timer offset. In some embodiments, the system includes a notification module executing on the agent. The notification module may be configured to send the notification to an agent executing on a remote device. In some embodiments, the system includes a response module configured to respond to the notification.

In some aspects, the present invention is directed to a method for managing one or more remote devices. In some embodiments, the method includes configuring one or more management commands. The commands may be configured by a central management server. In some embodiments, the method includes initiating a connection to the central management server. An agent executing on a remote device may initiate the connection. In some embodiments, the method includes retrieving one or more management commands. The commands may be retrieved via the connection. In some embodiments, the method includes scheduling the initiation of the connection. The initiation of the connection may be scheduled by a timer based on a timer offset, which may delay the initiation of the connection. In some embodiments, the method includes executing the commands on a remote device. In some embodiments, the method includes modifying the timer offset. The timer offset may be modified response to the execution of the commands. In some embodiments, the method includes notifying the agents to send a notification. The agents may be notified via a local network connected to one or more remote devices. In some embodiments, the method includes initiation the notification responsive to executing one or more of the management commands. In some embodiments, the method includes responding to the notification. An agent may respond to the notification.

DETAILED DESCRIPTION OF THE PREFERRED EMBODIMENTS

Figure 1:
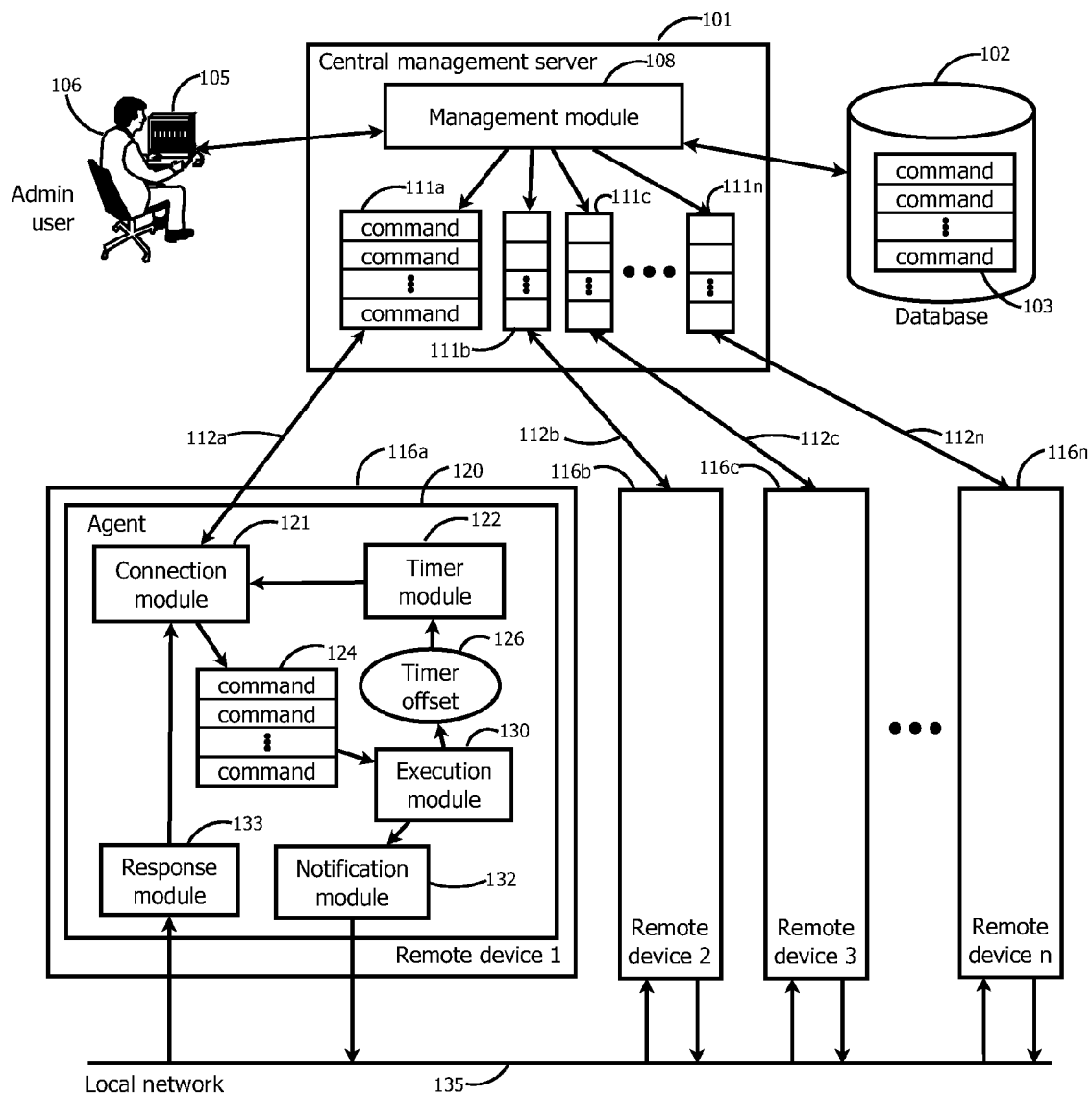
FIG. 1 is a block diagram of one embodiment of a system for providing management functions on remote devices.

Referring now to FIG. 1, a brief overview, and one embodiment of a system providing management function on remote devices 116a-n is shown. The central management server 101 provides these management functions using management commands 103 that are stored in a database 102. The management commands 103 are configured by an administrative user 106 using an interactive interface 105 to access a management module 108. Each remote device 116a-116n has a connection module 121 that initiates a connection 112a-112n to the management server 101 and retrieves the commands 111a-111n for that device. Referring again to FIG. 1, the configuration of one device 116a is exemplified. This configuration is repeated for all devices 116b-116n. An execution module 130 receives the commands 124 from the connection module 121 and executes them on the device 116a. Some of the commands 124 can modify a timer offset 126 that controls the delay of a timer module 122. The timer module 122 then controls the initiation of the connection 112a by the connection module 121. Other commands 124 can signal a notification module 132 to use a local network 135 to send a notification to other remote devices 116b-116n. A response module 133 in the agent 120 then responds to the notifications by signaling the connection module 121.

In further detail, central management server 101 may be designed and constructed to facilitate management functions by providing management commands. In some embodiments, the central management server 101 may include multiple, logically-grouped servers and may be referred to as a server farm. In some embodiments, the central management server 101 may include servers that are geographically dispersed. The server farm may be managed by a single entity. In some embodiments, the servers within each machine farm can be heterogeneous—one or more servers of central management server 101 can operate according to one type of operating system platform (e.g., WINDOWS NT, manufactured by Microsoft Corp. of Redmond, Wash.), while one or more of the other servers can operate on according to another type of operating system platform (e.g., Unix, Linux, or Mac OS X manufactured by Apple Computer Corp. of Cupertino, Calif.).

The central management server 101 may include a file server, application server, web server, proxy server, appliance, network appliance, gateway, gateway server, virtualization server, deployment server, SSL VPN server, or firewall.

In some embodiments, the central management server 101 includes a management module 108 designed and constructed to facilitate the configuration of management commands. The management module 108 may comprise of various hardware and/or software components including, e.g., an application, program, library, script, service, process, task or any other type and form of executable instructions executing on the central management server 101.

In some embodiments, the central management server 101 includes an interface designed and constructed to receive user input and data input, and output data. The interface may provide a user of the RMM (e.g., an administrative user) access to a functionality, operation, or service of the central management server 101, such as, e.g., the management module 108. To implement the functionality of the RMM, the interface may include any number of user interface components generally referred to as widgets. A widget may comprise any one or more elements of a user interface which may be actionable or changeable by the user and/or which may convey information or content. For example, a widget may be an input text box, dropdown menu, button, file selection, etc. Interface widgets may comprise any type and form of executable instructions that may be executable in one or more environments. Each widget may be designed and constructed to execute or operate in association with an application and/or within a web-page displayed by a browser. One or more widgets may operate together to form any element of the interface, such as a dashboard.

In some embodiments, the RMM includes commands 111a-111n that are sent and/or received from the management module 108 to one or more remote devices 116a-116n via a network. In some embodiments, the commands 111a-111n may be automatically generated by management module 108. In some embodiments, the commands 111a-111n may be generated by a user interacting with the management module 108 via an interface. In some embodiments, the commands may be generated in response to a condition, instructions, event, temporal condition, or request. In some embodiments, the commands are made up of a command code and parameters for the command. In some embodiments, commands can take an action on the remote device 116a-116n, request information about the remote device 116a-116n to be sent to the central management server 101, change the flow of control of commands based on conditions on the remote device 116a-116n, or change the flow of control of commands based on conditions on the central management server 101. In some embodiments, the commands 111a-111n for each remote device 116a-116n are generated by querying the database 102, extracting relevant commands for the device from the entire list of outstanding commands 103, and applying any device-specific customizations to the commands.

In some embodiments, the RMM includes a database 102 designed and constructed to store commands, profile information, authentication information, event logs from remote devices 116a-116n, device information about remote devices 116a-116n, customer information, scheduling information, configuration information. In some embodiments, the database 102 comprises a relational database such as SQL Server, manufactured by Microsoft Corp. of Redmond, Wash., or MySQL, manufactured by Oracle Corp. of Redwood Shores, Calif.

In some embodiments, the central management server 101 communicates with remote devices 116a-116n. The remote device 116a-116n may include, e.g., a computing device, desktop computer, portable computer, laptop, notebook computer, smartphone, personal digital assistant ("PDA"), tablet computer, electronic book reader, point of sale system, mainframe computer, rack mount server, workstation, turnkey system, thin client machine, virtual machine, embedded system, process controller, dedicated server, shared server, file server, application server, web server, proxy server, appliance, network appliance, gateway, gateway server, virtualization server, deployment server, SSL VPN server, firewall, etc. In some embodiments, a remote device 116a-116n may operate according to any type of operating system platform (e.g., WINDOWS NT, manufactured by Microsoft Corp. of Redmond, Wash., Unix, Linux, Mac OS or iOS, both manufactured by Apple Computer Corp. of Cupertino, Calif., Chrome OS or Android, both manufactured by Google Corp. of Mountain View, Calif.). In some embodiments, a remote device 116a-116n may operate with or without external storage. In some embodiments, a remote device 116a-116n may operate with or without a display. In some embodiments, a remote device 116a-116n may operate with or without user input devices. In some embodiments, a remote device 116a-116n may operate with constant network connectivity or with intermittent network connectivity. In some embodiments, a remote device 116a-116n may be a server class machine. In some embodiments, each remote device 116a-116n includes an agent 120 designed and constructed to receive, transmit, or execute commands or otherwise facilitate a functionality, operation, or service of the RMM. The agent 120 may comprise of various hardware and/or software components including, e.g., an application, program, library, script, service, process, task or any other type and form of executable instructions executing on the remote device 116a-116n.

In some embodiments, the agent 120 includes a connection module 121 designed and constructed to establish a connection to the RMM server in order to send and receive control information, send and receive configuration information, and send and receive status information. In some embodiments, the connection module 121 comprises a sequence of instructions to implement the HTTP interface in order to easily traverse firewalls and other network equipment. In some embodiments, the connection module 121 comprises a sequence of instructions to implement the HTTPS interface to provide enhanced security and privacy. In some embodiments, the connection module 121 uses a private protocol to communicate with the central management server 101.

In some embodiments, the agent 120 includes a timer module 122 designed and constructed to schedule and initiate operations of the agent 120. In some embodiments, the timer module 122 schedules connections from the agent 120 to the central management server 101, and signals the connection module 121 to initiate connections periodically at the proper time to implement the schedule. In some embodiments, the timer module 122 comprises a sequence of instructions to interact with the timer facilities of the operating system and use the resulting timer notifications to sequence events for the agent 120 and send the appropriate signals to implement the schedule of operations on the agent 120.

In some embodiments, the agent 120 includes a execution module 130 designed and constructed to execute basic operations on the agent 120 in order to implement commands 111a that are sent to the agent 120. In some embodiments, executing one operation on the execution module 130 sends a signal to the connection module 121, causing it to initiate a connection to the central management server 101. In some embodiments, executing one operation on the execution module sends a signal to the timer module 122, causing it to change the timer offset 126, and therefore change the schedule for some operations on the agent 120. In some embodiments, executing one operation on the execution module sends a signal to the timer module 122, causing it to change the period for signaling the connection module 121 to initiate connections on the agent 120. In some embodiments, executing one operation on the execution module 130 sends a signal to the notification module 132, causing it to send a notification to the agent on one of the other remote devices 116b-116n. In some embodiments, the execution module 130 comprises a sequence of instructions to act as an interpreter to decode the command codes and parameters of commands 124 and apply the resulting instructions to the agent 120.

In some embodiments, the agent 120 includes a notification module 132 designed and constructed to send notifications to the agents on other remote devices 116b-116n. In some embodiments, the notification module 132 comprises a sequence of instructions to construct and send User Datagram Protocol (UDP) packets to other remote devices 116b-116n using the local network 135. In some embodiments, these UDP packets are broadcast messages that are sent to all of the other remote devices 116b-116n at the same time. In some embodiments, the notification module 132 comprises a sequence of instructions to open a Transmission Control Protocol (TCP) connection to one of the other remote devices 116b-116n using the local network 135 and send a message to it using the connection.

In some embodiments, the agent 120 includes a response module 133 designed and constructed to monitor traffic on the local network 135, identify messages that are intended for the agent 120, receive those messages, and act upon them appropriately. In one embodiment, the response module 133 identifies messages that are intended to initiate a connection, and sends a signal to the connection module 121 causing it to immediately initiate a connection 112a to the central management server 101. In some embodiments, the response module 133 comprises a sequence of instructions to bind to a UDP socket, receive a packet on it, interpret the contents of the packet using a private protocol, and act on the contents based on the meaning of the contents under the private protocol. In some embodiments, the response module 133 comprises a sequence of instructions to bind to a TCP socket, accept connections on it, establish an incoming connection, receive data on it, interpret the contents of the data using a private protocol, and act on the contents based on the meaning of the contents under the private protocol.

Figure 2:
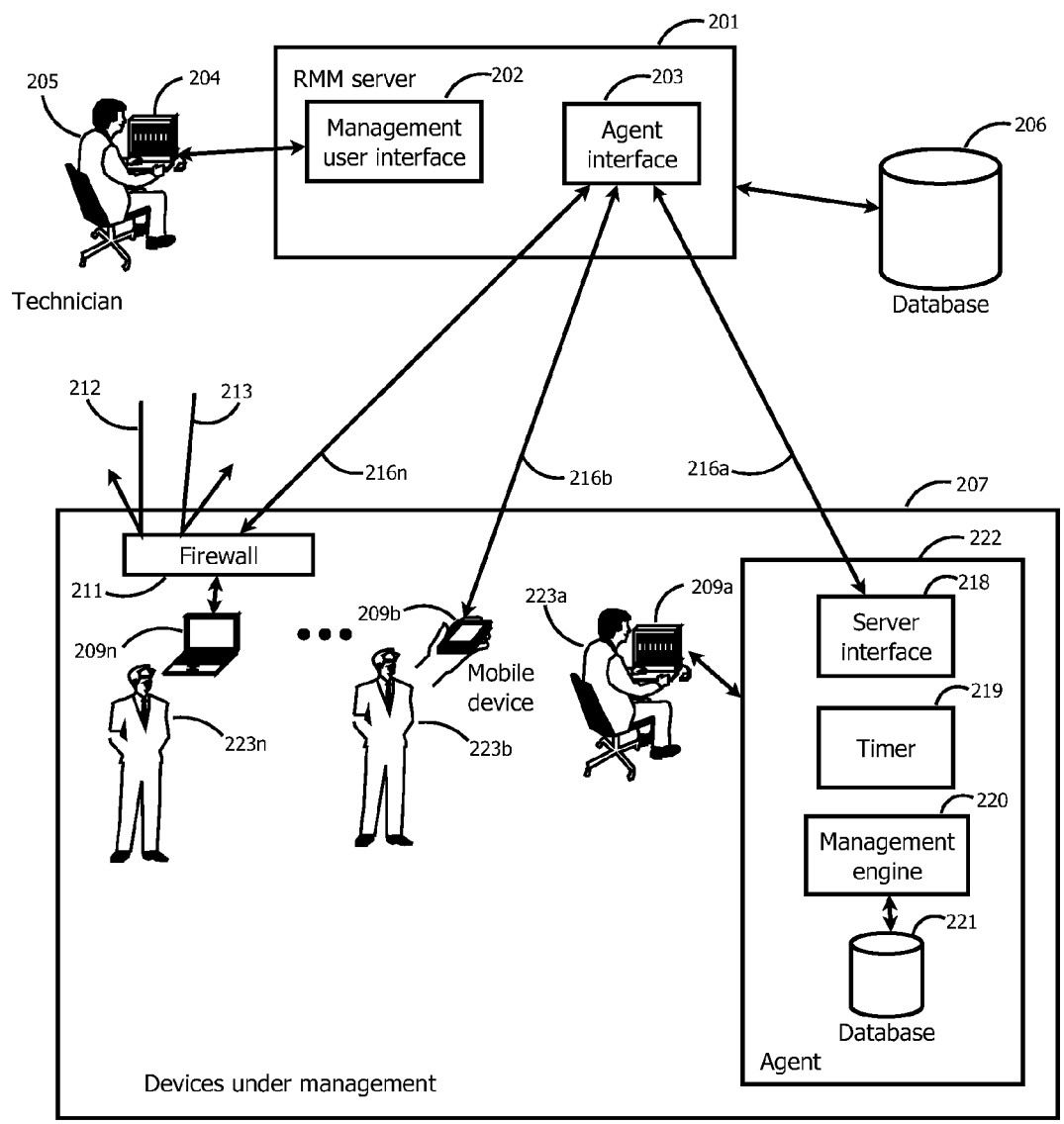
FIG. 2 is a block diagram showing one embodiment of an RMM system.

Referring now to FIG. 2, the overall architecture of one embodiment of an RMM system and its relationship to the present invention is shown. The RMM server 201 is used to coordinate all of the management and monitoring functions for the devices under management 207. The RMM server 201 includes an agent interface 203, a management user interface 202, and a database 206. A technician 205 uses a computer 204 connected to the management user interface 202 of the RMM server 201 in order to control the devices under management 207. The management user interface 202 updates the database 206 with operations or changes that need to be applied to one or more of the devices under management 207. At some later time, each of the devices under management 209a-209n establishes a connection 216a-216n to the RMM server 201. This is exemplified in FIG. 2 with the desktop machine 209a under management using the server interface 218 of its agent 222 to establish a connection 216a to the RMM server 201 through its agent interface 203. This communication uniquely identifies the device 209a to the RMM server 201, which checks its database 206 to see if any operations or changes are outstanding for the device 209a. If so, it returns these operations and changes to the server interface 218, which passes them along to the management engine 220, which in turn applies the operations and changes to the device 209a. The management engine 220 also uses a local database 221 to help keep track of the internal state of the device 209a.

The agent software 222 running on the device 209a includes a server interface 218, a management engine 220, a local database 221, and a timer 219. Each of the devices under management 209a-209n, such as a laptop 209n, a desktop 209a, or a mobile device 209b, has an agent running on the device that coordinates the device management without any involvement by the end users 223a-223n of the devices 209a-209n.

One of the important security aspects of this RMM architecture is the ability to operate without incoming connections. A device such as the laptop 209n typically has a firewall 211 that allows network connections to an external service, such as the agent interface 203, to be initiated by the device 209n, but which does not allow network connections to a service on the device 209n to be initiated outside the device 209n. These incoming connections such as 212 and 213 are blocked, by either dropping them or refusing them. Since these connections could originate anywhere, they could easily be from malicious software that is trying to exploit weaknesses and vulnerabilities in the software of the device 209n. Therefore, configuring the firewall 211 to simply not allow incoming connections provides a simple and convenient way to eliminate a wide variety of security issues.

In order to make this work in the RMM environment, a device under management 209n needs to initiate communication 216n with the agent interface 203 periodically. This is because the agent interface 203 has no way to initiate communication to the device 209n because any attempts to do so are blocked by the firewall 211. The agent 222 implements this periodic communication by using the timer 219 to drive the server interface 218 to initiate the communication 216a. As a result, changes made using the management user interface 202 will not be reflected on a device 209a immediately, but will instead be applied the next time the timer 219 causes the server interface 218 to communicate 216a with the agent interface 203 and retrieve the changes from the database 206 for the management engine 220 to apply to the device 209a.

Figure 3:
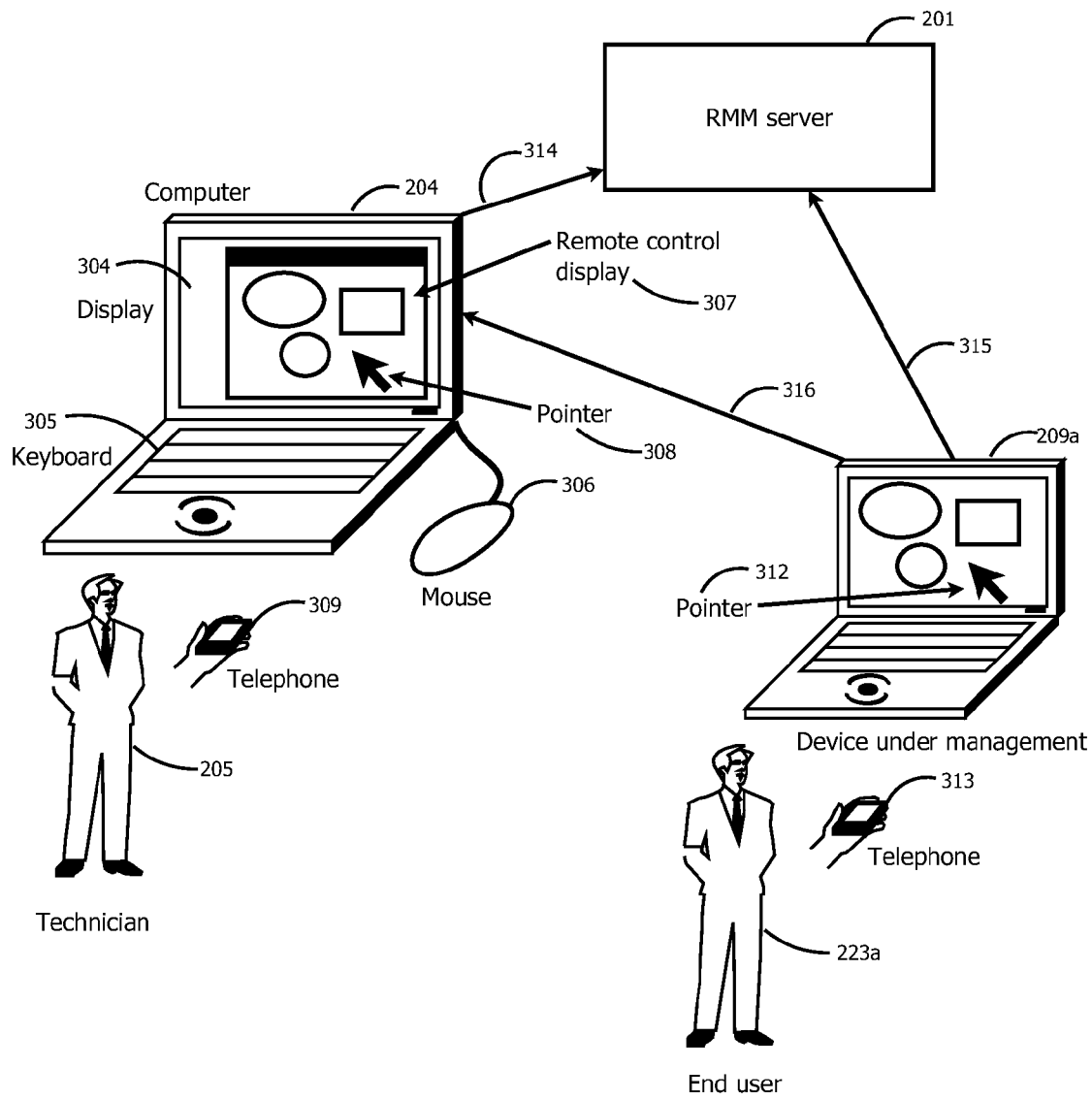
FIG. 3 is a block diagram of one embodiment of a way in which a fast response is needed by a device under management.

Referring now to FIG. 3, one embodiment is shown in which a fast response is needed by a device under management. In a fashion analogous to that illustrated in FIG. 2, a technician 205 uses a computer 204 to connect to an RMM server 201 to control a device under management 209a. In this instance, the technician 205 is using a remote control program to provide fine grained control over the device under management 209a with immediate feedback to the technician 205. The remote control program shows a remote control display 307 to the technician 205 that displays the same image seen on the display of the device under management 209a. When the technician uses the mouse 306 on the controlling computer 204 to move the pointer 308 on the remote control display 307, the pointer 312 on the device under management 209a moves in the same way. Similarly, when the technician 205 types on the keyboard 305 on the controlling computer 204, the same character codes are typed on the device under management 209a, as if the keys were being typed directly on the keyboard of that device. In some embodiments, the remote control display 307 includes an interface designed and constructed to receive user input and data input, and output data. The interface may provide a user of the RMM (e.g., the technician 205 using the remote control program) access to a functionality, operation, or service of the remote control program. To implement the functionality of the remote control program, the interface may include any number of user interface components generally referred to as widgets. A widget may comprise any one or more elements of a user interface which may be actionable or changeable by the user and/or which may convey information or content. For example, a widget may be an input text box, dropdown menu, button, file selection, etc. Interface widgets may comprise any type and form of executable instructions that may be executable in one or more environments. Each widget may be designed and constructed to execute or operate in association with an application and/or within a web-page displayed by a browser. One or more widgets may operate together to form any element of the interface, such as a dashboard This remote control is initiated in the manner illustrated in FIG. 2, namely, the timer 219 in the agent 222 initiates a connection 216a to the RMM server 201 and retrieves the command to start the remote control program, and then the management engine 220 coordinates the process. In FIG. 3, the agent on the device under management 209a initiates the connection 315 to the RMM server 201 and starts the remote control session. The communication to operate the remote control function may go through the two connections 314 and 315 to the RMM server 201, with the RMM server providing a relay function for the communication, or it may be implemented with a direct connection 316 from the device under management 209a to the controlling computer 204, for increased efficiency in the communication and reduced load on the RMM server 201.

One way that the remote session may be initiated is if the end user 223a of the device under management 209a is having some trouble and uses a telephone call to request assistance. With the end user 223a using a telephone 313 to call the technician 205 on a telephone 309, the end user 223a requests that the technician 205 take control of the device under management 209a in order to help solve an issue. The technician 205 initiates the remote control session on the RMM server 201, but then both the end user 223a and the technician 205 must wait for the agent on the device under management 209a to start the process. Typically, the end user 223a is in a hurry and is not pleased with having to request assistance in the first place, and so is therefore not in a good frame of mind to wait for the assistance to begin.

FIG. 3 shows one embodiment where a delay in the agent on the device under management 209a causes an issue. Another embodiment is one where the technician 205 needs to see the results of one operation before proceeding with the next. There are many embodiments that are apparent to one skilled in the art.

Figure 4:
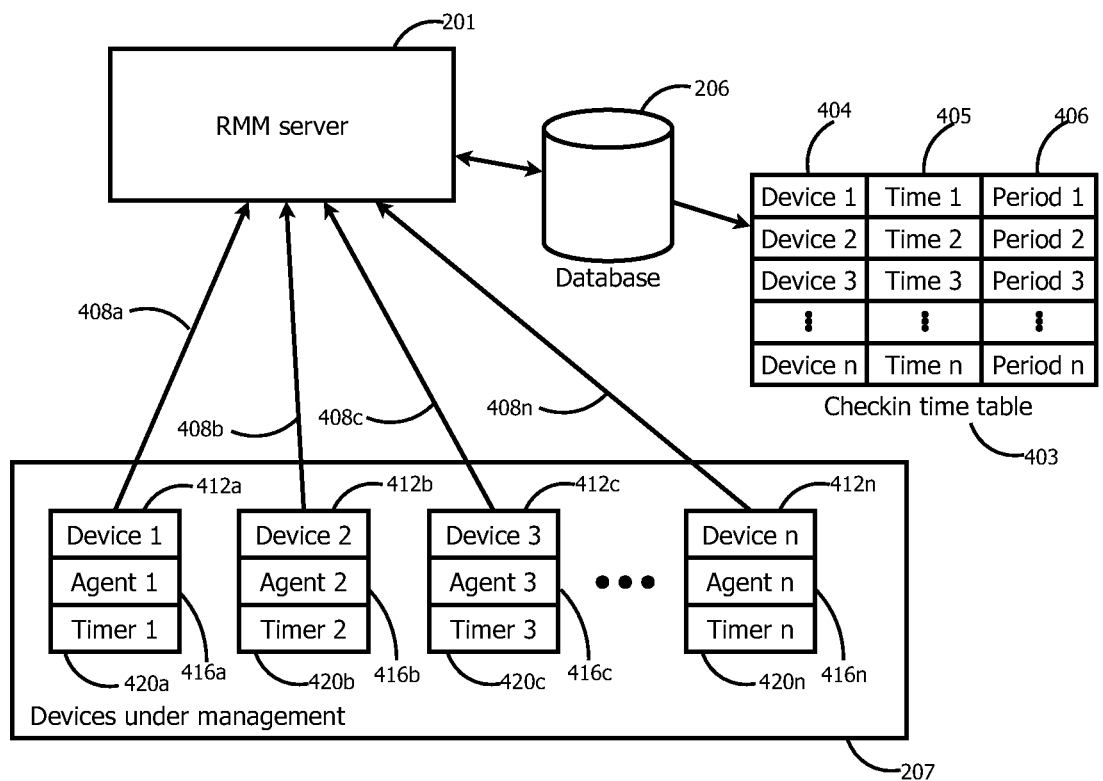
FIG. 4 is a block diagram of one embodiment of an RMM server managing a site with many devices.

Referring now to FIG. 4, one embodiment is shown with many devices under management by an RMM system. The RMM server 201 is used to manage a group of devices under management 207. Each of the devices 412a-412n has an agent 416a-416n with a timer 420a-420n. The timers 420a-420n are used to initiate the communication 408a-408n with the RMM server 201 for each agent, in order to retrieve commands for the agents.

The agents 416a-416n do not communicate with each other, so the timers 420a-420n are unsynchronized. They may be random with respect to each other, or they could be accidentally synchronized through some external event, such as a power failure followed by a restart of all the devices under management 207. Because of this lack of coordination, in one embodiment, the timers 420a-420n initiate the communications 408a-408n at about the same time. With a large number of devices under management 207, this represents a significant load on the RMM server 201, requiring excessive resources on that server in order to handle the load. In one embodiment of the present invention, the RMM server 201 coordinates the timers 420a-420n to spread out the communications 408a-408n evenly in the time period over which the communication is initiated. In one embodiment, each agent 416a-416n communicates with the RMM server 301 every 5 minutes, and there are 60 devices under management 207, so it is more efficient to have a different agent timer in the timers 420a-420n initiate the corresponding communication 408a-408n every 5 seconds. Agent 1 416a initiates communication 408a, then 5 seconds later, agent 2 416b initiates communication 408b, then 5 seconds later, agent 3 416c initiates communication 408c, and so on.

The RMM server 201 manages this communication timing by using its database 206 to maintain a checkin time table 403. The checkin time table 403 has a row for each device 412a-412n, and each row has a column for the device identifier 404, the next checkin time 405, and the checkin period 406. The RMM server 201 uses this information to calculate a desired schedule for the timers 420a-420n that spreads out the communications 408a-408n evenly. Then it compares the desired schedule to the actual schedule 405 in the checkin time table 403. For each device 404 in the table, if the timer of an agent needs to be adjusted to match the desired schedule, the RMM server 201 prepares a command for that agent to modify its timer by a specific offset to make it match the desired schedule. After one checkin by each of the agents 416a-416n, the timers 420a-420n are adjusted to make the communications 408a-408n much more efficient and balance the load on the RMM server 201.

Figure 5:
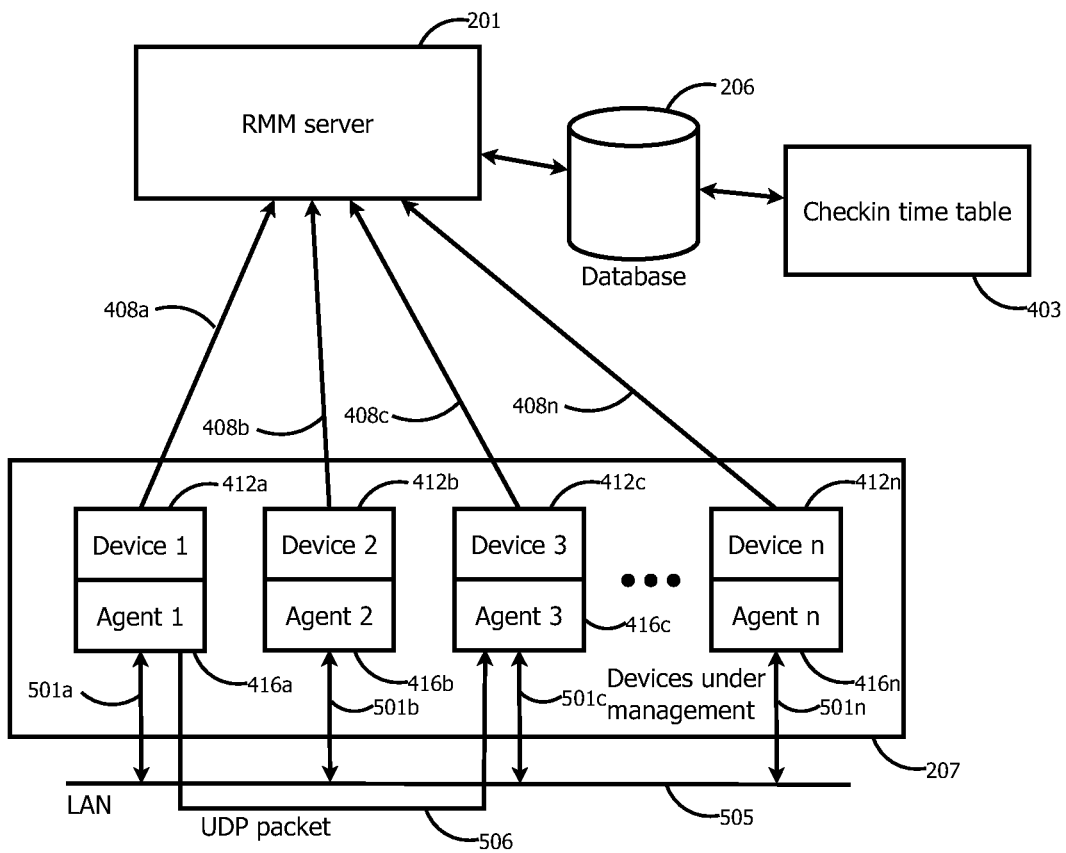
FIG. 5 is a block diagram of one embodiment of timer management used to achieve a faster response by an agent.

Referring now to FIG. 5, one embodiment in which timer management is used to achieve a faster response by an agent is shown. The RMM server 201 is managing a number of devices under management 207. Each device 412a-412n has an agent 416a-416n that initiates communication 408a-408n with the RMM server 201. As described previously, the RMM server 201 uses a database 206 with a checkin time table 403 to spread out the communications 408a-408n evenly.

In one embodiment, the devices under management 412a-412n are connected with a Local Area Network (LAN) 505. Each device under management 412a-412n has a connection 501a-501n to the LAN 505 that enables it to communicate with the other devices under management. What follows exemplifies one embodiment of the process of the RMM server 201 getting a quick response from one of the agents by using the LAN 505. In this example, the RMM server 201 needs the agent 3 416c on device 3 412c to initiate communication 408c immediately, in order to start a remote session as described in FIG. 3. However, the checkin time table 403 indicates that agent 3 416c is not going to initiate communication 408c for another 3 minutes. The checkin time table 403 also indicates that agent 1 416a on device 1 412a is going to initiate communication 408a in about 5 seconds. The RMM server 201 sets up a command for agent 1 416a to notify agent 3 416c to check in immediately. Then, within a few seconds, agent 1 416a initiates communication 408a and retrieves this notification command. It then processes the command, using the LAN 505 to send a User Datagram Protocol (UDP) packet 506 to agent 3 416c telling it to check in immediately. Agent 3 416c responds by initiating communication 408c and retrieving its command to start the remote control session. Agent 3 416c then starts the remote control session. The quick responsiveness of agent 3 416c is achieved as desired. In one embodiment, the RMM server 201 sets up a command for agent 1 416a to notify those agents (out of the agents 416b-416n) with outstanding commands on the RMM server 201 that have not yet been retrieved.

In one embodiment, the agents 416a-416n operate without communicating with each other through the LAN 505, in order to reduce the risk of any kind of worm-like behavior that could be propagated by taking advantage of an unintended vulnerability in the agent. However, in another embodiment, the present invention as described allows the agents 416*a*-416*n* to communicate as described without introducing any increased risk, because it only requires that the agents open a port for one specific UDP packet. The agents only respond to that packet by initiating communication to the RMM server, so no other malicious behavior can be provoked.

Figure 6:
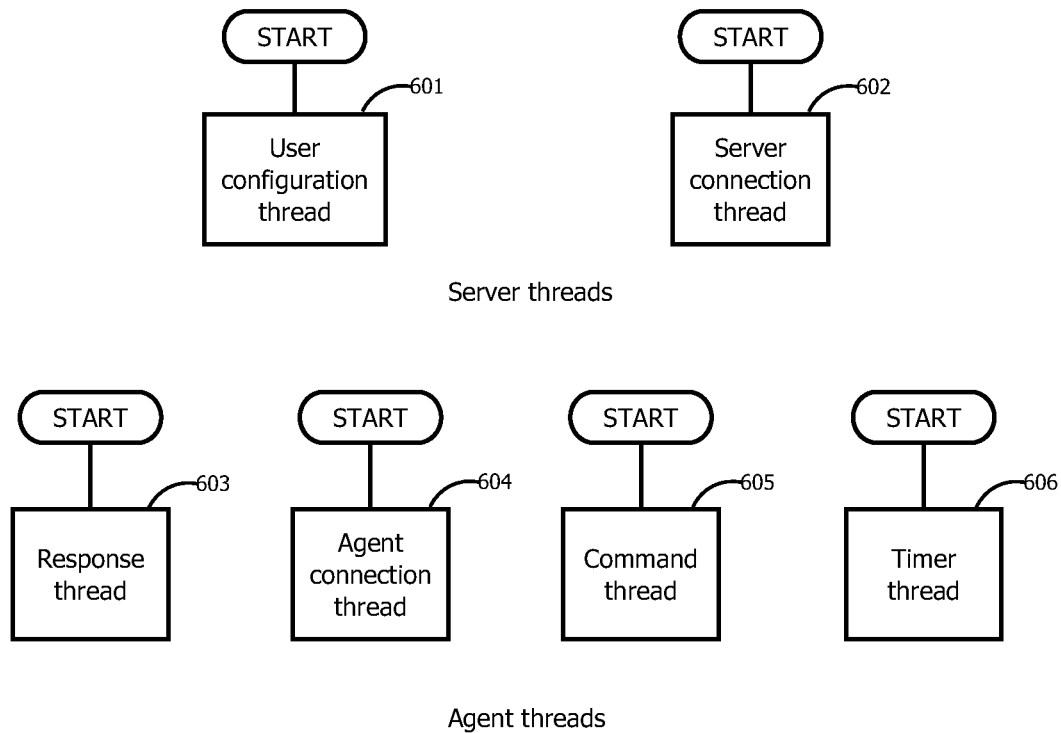
FIG. 6 is a block diagram of one embodiment of a system for providing management functions on remote devices.

Referring now to FIG. 6, a block diagram of the operation of one embodiment of the overall system is shown. The operation is divided into multiple concurrent threads of execution. The central management server has two threads, the user configuration thread 601 and the server connection thread 602. The agent has four threads, the response thread 603, the agent connection thread 604, the command thread 605, and the timer thread 606. These threads are described more fully in additional figures.

Figure 7:
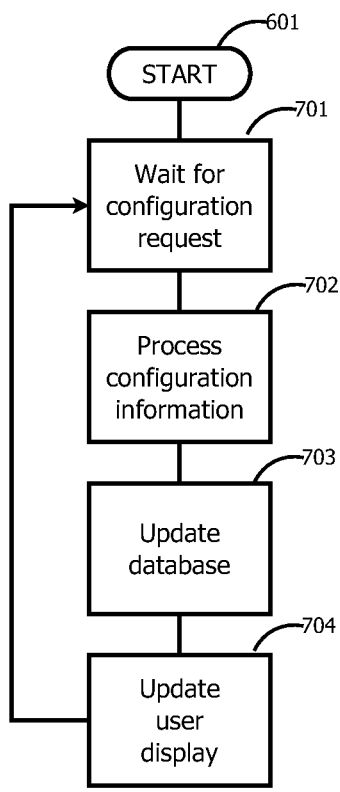
FIG. 7 is a flowchart depicting one embodiment of the steps taken by the user configuration thread.

Referring now to FIG. 7, a flowchart of one embodiment of the user configuration thread 601 is shown. The thread waits 701 for a configuration request from the end user. When such a request arrives, the thread processes 702 the request and updates 703 the database with the new configuration information. It then updates 704 the display presented to the user to make it match the new configuration.

Figure 8:
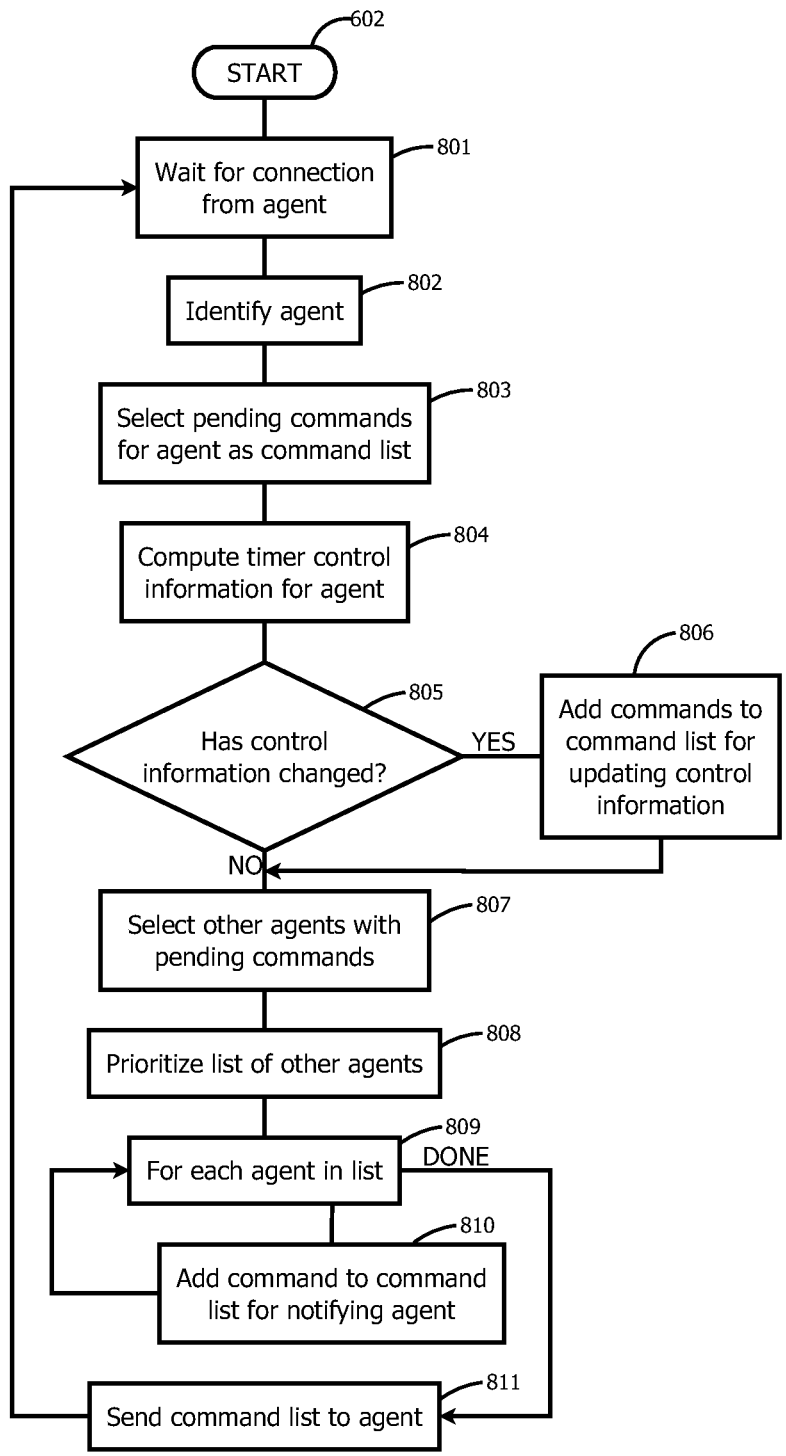
FIG. 8 is a flowchart summarizing depicting one embodiment of the steps taken by the server connection thread.

Referring now to FIG. 8, a flowchart of one embodiment of the server connection thread 602 is shown. The thread waits 801 for a connection from an agent. When such a connection is made, the thread identifies 802 the agent using information in the connection data. It then selects 803 the commands from the database that are currently pending for that agent, and places them into a command list. Next, it computes 804 the control information for the timer on that agent. Step 804 is described more fully in FIG. 9. If the control information for the timer has changed 805, then the thread adds 806 commands to the command list that will cause the agent to update that control information. If the control information has not changed, it proceeds without adding additional commands. The thread then selects 807 from the database a list of the other agents that have any pending commands, and then prioritizes 808 this list. The thread then repeats 809 an operation for every agent in the prioritized list; the operation is to add 810 a command to the command list that will cause the agent in the list to be sent a notification. When the list is completely processed, the resulting command list is then sent 811 to the agent that made the connection. The thread then returns to step 801 to await another connection from an agent.

Figure 9:
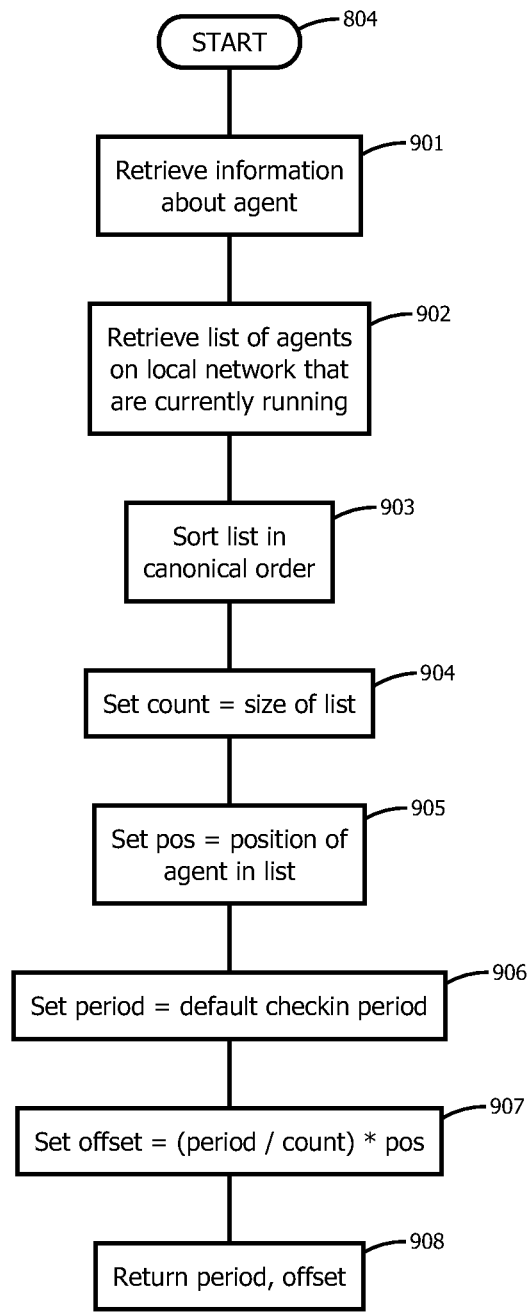
FIG. 9 is a flowchart depicting one embodiment of the steps taken to compute timer control information for an agent.

Referring now to FIG. 9, a flowchart further detailing one embodiment of the process 804 for computing the timer control information for an agent is shown. The process starts by retrieving 901 information about the agent. Then it retrieves 902 from the database a list of all the agents on the local network that are currently running. It sorts 903 this list in a canonical order, where the exact ordering is unimportant as long as the same set of agents always gets sorted in the same order. Next, it computes 904 the variable count as the size of the list, and computes 905 the variable pos as the position of the agent in the list. It then computes 906 the variable period as the default checkin period, and computes 907 the variable offset as (period/count)*pos. It then returns 908 the variables period and offset as the timer control information for the agent.

Figure 10:
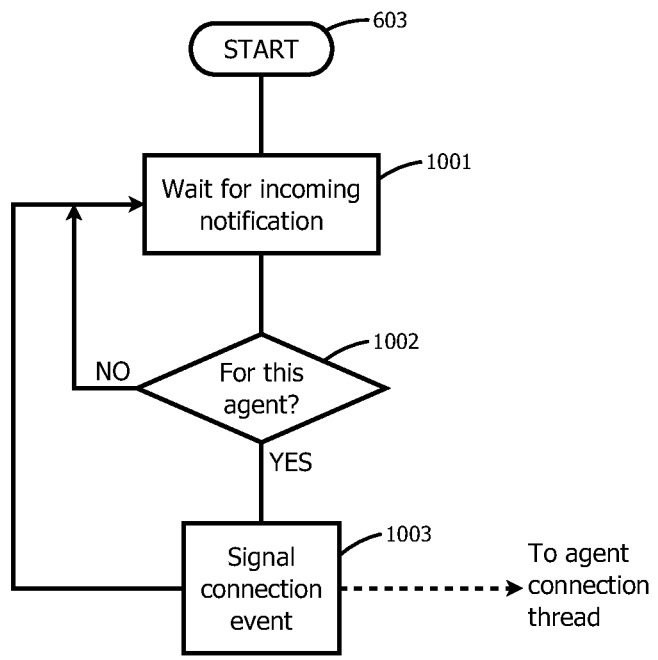
FIG. 10 is a flowchart depicting one embodiment of the steps taken by the response thread.

Referring now to FIG. 10, a flowchart of one embodiment of the response thread 603 is shown. The thread waits 1001 for an incoming notification from the network. When such a notification arrives, it checks 1002 whether or not the notification is intended for this agent. If not, it proceeds back to step 1001 to wait for another notification. If the notification is intended for this agent, it immediately signals 1003 a connection event, which is sent to the agent connection thread 604.

Figure 11:
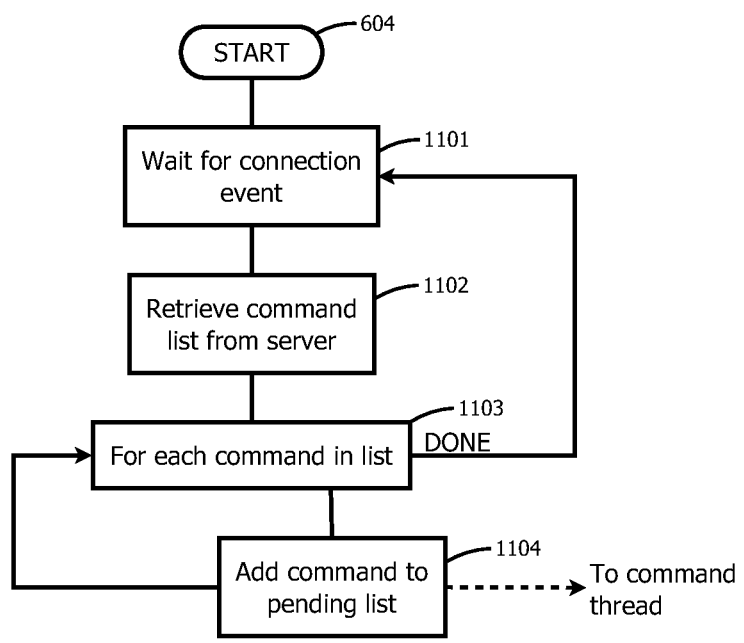
FIG. 11 is a flowchart depicting one embodiment of the steps taken by the agent connection thread.

Referring now to FIG. 11, a flowchart of one embodiment of the agent connection thread 604 is shown. The thread waits 1101 for a connection event. When such an event is signaled, it establishes a connection to the management server and retrieves 1102 a list of commands. It then repeats 1103 an operation for each command in the list; the operation is to add 1104 the command to the list of commands that are pending for the agent to process. This is done by sending a signal to the command thread 605 with the command in it. When all the commands have been processed this way, the thread proceeds back to step 1101 to await the next connection event.

Figure 12:
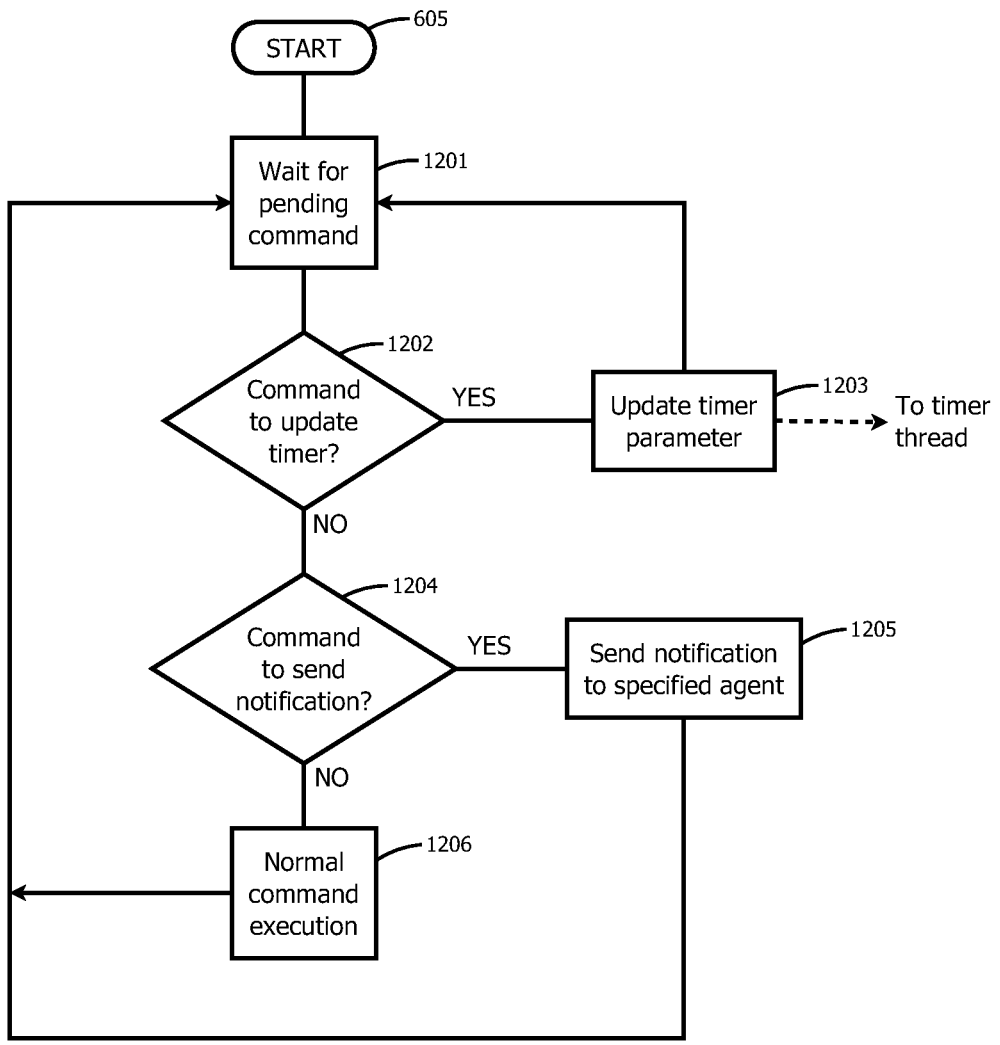
FIG. 12 is a flowchart depicting one embodiment of the steps taken by the command thread.

Referring now to FIG. 12, a flowchart of one embodiment of the command thread 605 is shown. The thread waits 1201 for a pending command for the agent. When such a command becomes available, it checks 1202 to see whether the command is one that is meant for updating a timer parameter. If so, it updates 1203 the appropriate timer parameter by sending a signal to the timer thread 606, and then proceeds back to step 1201 to await the next pending command. If not, it then checks 1204 to see whether the command is one that is meant for sending a notification. If so, it sends 1205 a notification to the agent specified in the command and then proceeds back to step 1201 to await the next pending command. If not, then it treats 1206 the command as one that is used for a management function and executes it normally. Then it proceeds back to step 1201 to await the next pending command.

Figure 13:
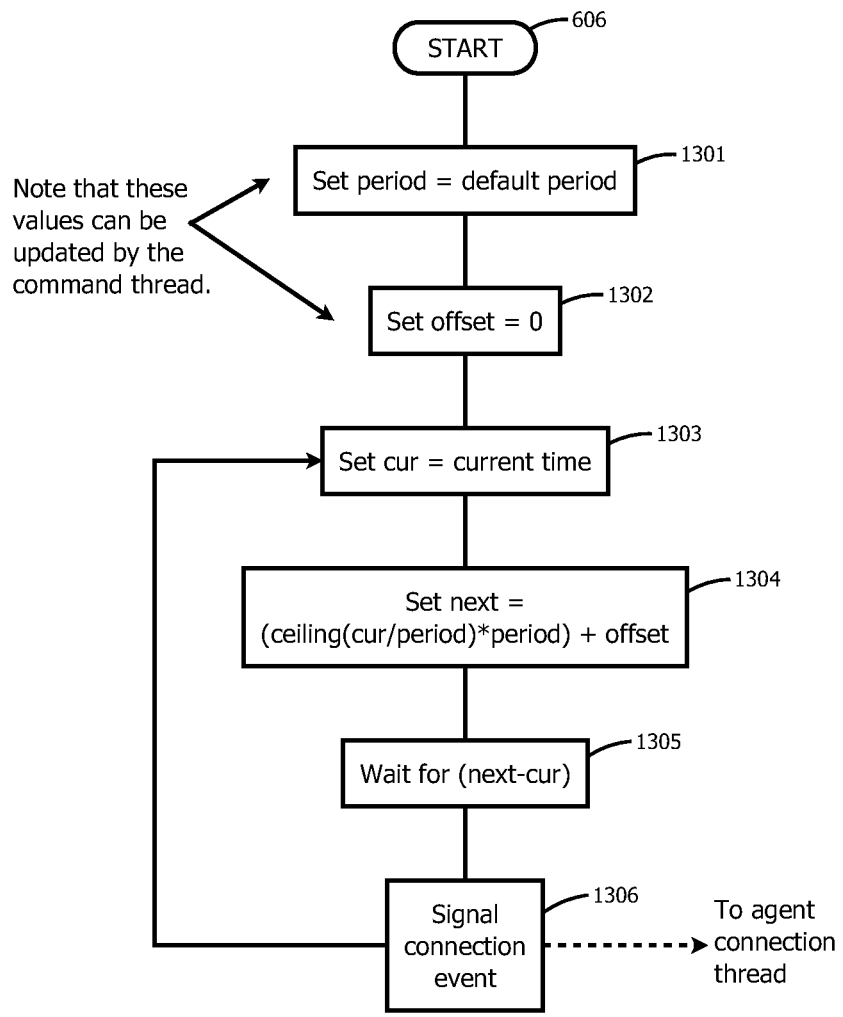
FIG. 13 is a flowchart depicting one embodiment of the steps taken by the timer thread.

Referring now to FIG. 13, a flowchart of one embodiment of the timer thread 606 is shown. When the thread is initializing, it sets 1301 the variable period to the default timer period, and sets 1302 the variable offset to zero. Note that both of these values can be updated by a signal from the command thread 605, at step 1203. The timer thread then goes into a loop, where it sets 1303 the variable cur to the current time. Then it computes 1304 the variable next as (ceiling(cur/period)*period)+offset, where the ceiling( ) function returns the smallest integer that is greater than or equal to the parameter. Next, the thread initiates 1305 a wait for a time period equal to (next−cur). When this wait is finished, the thread signals 1306 a connection event, which is sent to the connection thread, and then proceeds back to step 1303 to prepare for the next timer interval.

There are many practical and operational refinements to the present invention that arise in actual use. These refinements are apparent to one skilled in the art, but have not been described in the detailed embodiments above. Some of these refinements are listed here as examples. This is not a comprehensive list but is intended to demonstrate additional aspects of the power and flexibility of the invention.

In one embodiment, the RMM server sends a command to an agent to put it into a "fast talk" mode where it checks in with a much shorter period. This continues the increased responsiveness during an extended operation without affecting any other agents or putting an excessive load on the RMM server. The RMM server then sends a command to the agent to exit the "fast talk" mode once the interactive operation is complete.

In some embodiments, the RMM server prioritizes which agent to use for sending the UDP packet as described in FIG. 5, based on the likelihood of the agent being available to send the packet. In one embodiment, the RMM server prefers to use server machines over laptop machines. In another embodiment, it prefers to use machines that have checked in recently over ones that appear to be offline. In each of these embodiments, the commands sent to each agent by the RMM server are dependent on the identity of the agent retrieving the commands.

In some embodiments, the checkin period of different agents is different. In one embodiment, servers check in more frequently than laptops, since the demand to manage them is typically higher.

In one embodiment, the agent notification is done without requiring the IP address of the agents, by using a UDP broadcast that includes the device identifier. In this embodiment, each agent inspects the broadcast packet and decides whether or not it was the intended recipient, and reacts appropriately.

In one embodiment, agents report to the RMM server whether they have moved to a different network, and when they have moved, the RMM server avoids using them to communicate with other agents. One way this happens is if an end user takes home a laptop computer. In another embodiment, the RMM server avoids sending any commands to notify agents that have moved, since they cannot be reached.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

What is claimed:

1. A system for managing remote devices, comprising:
a management module, executing on one or more processors of a central management server, that generates a first management command to modify a timer offset and provides the first management command to a first remote device;
a connection module, executing on the first remote device, that receives the first management command to modify the timer offset and initiates, responsive to expiration of a timer on the first remote device modified by the timer offset, a first connection with the central management server;
the management module provides, to the first remote device, during the first connection, a second management command to initiate a notification, the notification comprising a device identifier of a second remote device, wherein the management module configures the second management command to initiate the notification of the second remote device responsive to identifying that the second remote device has not received the second management command;
a notification module, executing on the first remote device, that receives the second management command during the first connection and broadcasts the notification to one or more remote devices different from the first remote device; and
a response module, executing on the second remote device of the one or more remote devices, that receives the notification with the device identifier broadcast by the first remote device and initiates, responsive to the notification, a second connection with the central management server.

2. The system of claim 1, further comprising a timer module that initiates the first connection periodically at a frequency determined by a timer period.

3. The system of claim 2, wherein the first management command is configured to modify the timer period.

4. The system of claim 1, wherein the response module immediately initiates the second connection to the central management server responsive to the notification.

5. The system of claim 2, wherein a third management command controls a fast-talk mode of the remote device wherein the timer period is temporarily shortened.

6. The system of claim 1, wherein the first management command retrieved by the connection module is dependent upon an identity of the first remote device initiating the connection.

7. The system of claim 1, wherein the first management command retrieved by the connection module does not include commands configured to initiate notification of a remote device of the one or more remote devices that cannot be reached using a local network connecting the one or more remote devices via the notification broadcast by the first remote device.

8. The system of claim 1, wherein the first management command retrieved by the connection module comprises a command configured to initiate notifications that are prioritized using a priority based on information about the second remote device initiating the second connection.

9. The system of claim 8, wherein the priority is higher for remote devices that are servers.

10. The system of claim 8, wherein the priority is higher for remote devices that are currently connected to a local network connecting the one or more remote devices.

11. The system of claim 1, wherein the timer offset is computed to evenly spread out timing of connections by the one or more remote devices.

12. The system of claim 1, wherein the notifications are sent using a broadcast message via a local network connecting one or more of the one or more remote devices.

13. A method for managing one or more remote devices, comprising:
configuring, by one or more processors of a central management server, a first management command to modify a timer offset;

providing, by the central management server, the first management command to a first remote device;
initiating, by the first remote device, responsive to expiration of a timer on the first remote device modified by the timer offset, a first connection with the central management server;
providing, by the central management server, to the first remote device, during the first connection, a second management command to initiate a notification, the notification comprising a device identifier of a second remote device, wherein the second management command is configured to initiate the notification of the second remote device responsive to identifying that the second remote device of the one or more remote devices has not received the second management command;
receiving, by a notification module executing on the first remote device, the second management command during the first connection;
broadcasting, by the first remote device, the notification to one or more remote devices different from the first remote device;
receiving, by a response module executing on the second remote device of the one or more remote devices, the notification with the device identifier broadcast by the first remote device; and
initiating, by the second remote device responsive to the notification, a second connection with the central management server.

14. The method of claim 13, further comprising:
initiating the first connection periodically at a frequency determined by a timer period.

15. The method of claim 14, further comprising:
modifying the timer period as a result of executing the first management command.

16. The method of claim 14, further comprising:
using a third management command to control a fast-talk mode of the first remote device wherein the timer period is temporarily shortened.

17. The method of claim 13, further comprising:
responding, by the second remote device, to the notification by immediately initiating the second connection to the central management server.

18. The method of claim 13, further comprising:
configuring a third management command to initiate notifying the one or more remote devices that have not yet retrieved one or more commands.

19. The method of claim 13, further comprising:
selecting commands retrieved by the first connection depending upon an identity of the first remote device initiating the first connection.

20. The method of claim 13, further comprising:
selecting commands retrieved by the first connection that do not include commands configured to initiate notification of a remote device of the one or more remote devices that cannot be reached via the notification broadcast by the first remote device using the network.

21. The method of claim 13, further comprising:
prioritizing commands configured to initiate notification using a priority based on information about the first remote device initiating the first connection.

22. The method of claim 21, further comprising:
providing a higher priority for remote devices that are servers.

23. The method of claim 21, further comprising:
providing a higher priority for remote devices that are currently connected to the network.

24. The method of claim 13, further comprising:
using the timer offset to evenly spread out a timing of connections by the one or more remote devices.

25. The method of claim 13, further comprising:
sending the notification using a broadcast message on the network.

* * * * *